Oct. 8, 1940.  O. E. ROSEN  2,216,924
TRACER FOR DUPLICATING MACHINES
Original Filed May 28, 1936
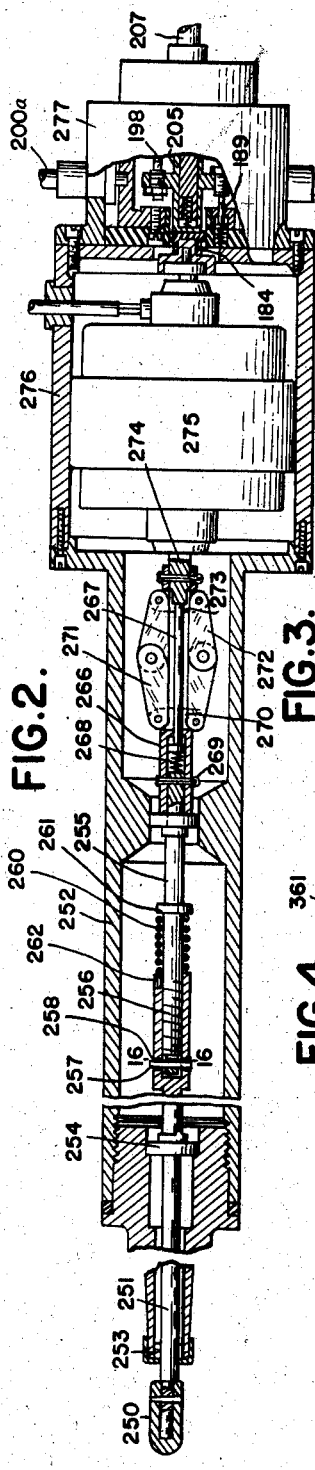
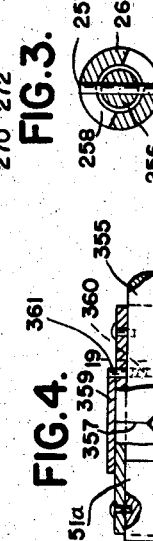
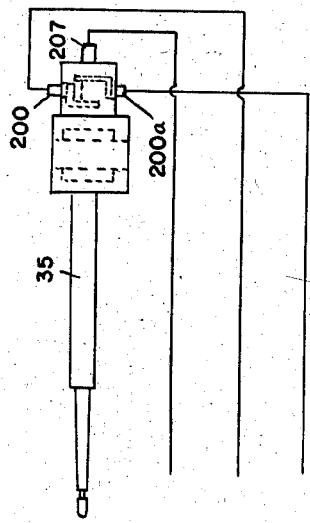
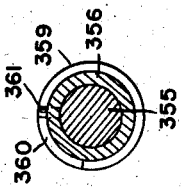
INVENTOR.
OSCAR E. ROSEN
BY
ATTORNEYS Patented Oct. 8, 1940

2,216,924

UNITED STATES PATENT OFFICE 2,216,924

TRACER FOR DUPLICATING MACHINES

Oscar E. Rosen, Detroit, Mich.

Original application May 28, 1936, Serial No. 82,362. Divided and this application November 16, 1939, Serial No. 304,804

5 Claims. (Cl. 90—62)

The present invention relates to tracers for duplicating machines and has among its objects one which eliminates the necessity for lateral or longitudinal displacement of the tip in order to accomplish the reaction upon the cutter, such tracers being particularly useful in reproducing from a flat template contacting the tracer point laterally, though not limited to such use, since the tracer likewise is operable through contact with its end.

Other objects will readily occur to those skilled in the art upon reference to the following description and the accompanying drawing in which Figure 1 is a view in elevation of the tracer showing the conductors attached.

Figure 2 is a longitudinal section through the tracer.

Figure 3 is a section on line 16—16 of Figure 2.

Figure 4 is a section showing a modified form of a part of the tracer.

Figure 5 is a section on line 19—19 of Figure 4.

In the drawing, the tracer point 250 is shown as carried upon a shaft 251 freely rotatable in a tubular housing 252 in suitable bearings 253 and 254, the shaft being movable endwise in the former while the latter 254 maintains the shaft against longitudinal movement outwardly of the housing. The inner end of shaft 251 is preferably enlarged, bored axially and tapped as at 256 to receive the screw threaded end of a continuation shaft 255 and the end of the latter drilled diametrically to receive a pin 257 which extends through the walls of the tapped portion of shaft 251 through arc shaped slots 258. This arrangement permits a limited relative rotation between shafts 251 and 255.

Relative rotation of shaft parts 251 and 255 is however prevented under ordinary conditions by means of a spring 260 surrounding shaft 255 and fixed thereto at one end through a suitable collar 261. The other end of the spring 260 is fixed to shaft 251 as at 262. Suitable tension may be given to spring 260 by rotation of collar 261 and fixing its position, as by a suitable set screw.

Shaft 255 is carried in a suitable bearing 265, slidably axially in the housing 252 and has mounted thereon a cap 266, perforated at its end to permit passage of a pin 267, the headed end of which is pressed axially outward by means of a spring 268. The cap 266 is prevented from rotation on shaft 255 by means of a cotter pin 269. Fixed across the end of cap 266 is a yoke element 270 to which are pivoted the arms 271 of a flyball governor, the other arms 272 of which are pivoted to a second yoke 273 fixed across the end of a shaft 274 constituting the armature shaft of a small electric motor 275 mounted within an enlarged continuation 276 of housing 252.

At the rear end of the motor housing 276 is mounted a small casing 277 enclosing the electric contacts operable through the endwise movement of the shaft 274, the latter carrying an insulated member 184 against which is spring pressed a movable contact carrier 205. This latter is connected to the conductor 207 and in moving may contact either of the stationary contacts 198 or 189, these being connected with the conductors 200 and 200a, respectively.

In the operation of this form of tracer, the motor 275 of very low horsepower rotates the tracer tip at high speed but with small force, and, if a resistance, such as frictional contact, is applied to the tip at any part the speed will be reduced. The momentary reduction of the speed of rotation of the tip will cause a relative rotation between the parts 251 and 255 of the shaft, thereby lengthening the latter. When this happens, shaft part 251 cannot move because of the thrust bearing 254, so the part 255 moves backward and thereby moves the armature shaft which, in turn, operates the contacts in the housing 277.

Further, when the shaft 255 is being rotated at high speed, the governor (270—273) is thrown outward, maintaining the armature shaft in its forward position. Slowing down of the governor will, therefore, allow the weights to move inwardly and lengthen the distance between the armature shaft and cap 266, thereby moving the armature shaft backward and thus operating the contacts.

While Figure 2 shows both the spring device 260 and the governor for producing the same result, either may be used by itself.

In Figure 4 there is shown another form of construction for causing lengthening of the shaft when its two portions are relatively rotated. In this form, the two parts 351a and 355 (the part 351a being shown as an enlargement at the end of part 351) are provided with sleeves 352 and 356, respectively, which abut as at 357 and are notched as at 358 to provide an angular hole in which lies a ball 353.

The sleeves 352 and 356 are fixed to their respective shaft portions by suitable pins or screws and in such position that the end of one shaft part extends into the sleeve upon the other part to act as a pilot and also to back up the ball 353 in the hole 358. A third sleeve 359 overlies the junction of the other two and is fixed to sleeve 352 so as to act as a retainer for the ball 353. This sleeve 359 is also preferably notched at one end as at 360 to cooperate with a pin 361 in sleeve 356, the pin and notch serving to limit the relative rotary movement of the several parts.

The present case is a division of Serial No. 82,362, filed May 28, 1936, for "Profiling machines" and in the name of the present applicant.

I claim:

1. A tracer for pattern controlled reproducing machines comprising a housing, a divided rotatable shaft mounted therein and extending therefrom, a tracer point carried by said extension, means for rotating said shaft, means for automatically changing the length of said shaft when said point contacts with the pattern and electric circuit closing means actuated by said length changing action.

2. A tracer for pattern controlled reproducing machines comprising a housing, a divided rotatable shaft mounted therein and having one of the parts thereof extending from the housing, a tracer point carried by said extension, means for rotating the other part of said shaft, and coupling means for said shaft parts, said coupling means including means interposed between said ends for moving said ends relatively longitudinally upon retarding the rotation of one of the shaft parts, and electric contact means actuable by the longitudinally movable shaft part.

3. A tracer for pattern controlled reproducing machines comprising a housing, a divided rotatable shaft mounted therein and having one of the parts thereof extending from the housing, a tracer point carried by said extension, means for rotating the other part of said shaft, and coupling means for said shaft parts, said coupling means including male and female threaded shaft portions coacting to couple said portions in driving relation, resilient means tending to maintain the shaft portions in normal driving relation but allowing relative rotation of the shaft parts, and means to limit such relative rotation, and electric contact means in operative relation to one of said shaft parts.

4. A tracer for pattern controlled reproducing machines comprising a housing, a divided rotatable shaft mounted therein and having one of the parts thereof extending from the housing, a tracer point carried by said extension, means for rotating the other part of said shaft, flyball governor means connecting said parts in driving relation and constituting speed responsive means for moving the shaft parts relatively longitudinally, and electric contact means operatively connected to one of the shaft parts.

5. In a tracer for pattern controlled reproducing machines an electric motor having its rotor shaft mounted for limited longitudinal movement, electric contact means adapted to be actuated by the longitudinal movement of said shaft, a tracer finger rotatably mounted and adapted to be rotated by said motor but fixed against longitudinal movement and coupling means for said motor and finger constructed and arranged to cause longitudinal movement of the said rotor shaft upon retardation of the rotation of said finger.

OSCAR E. ROSEN.